March 3, 1959 H. G. DE FRANCE 2,876,278

COLOR TELEVISION SYSTEMS

Filed Jan. 28, 1952 7 Sheets-Sheet 1

INVENTOR
HENRI GEORGES DE FRANCE
BY
Bailey, Stephens & Huettig
ATTORNEYS

INVENTOR
HENRI GEORGES DE FRANCE
BY
Bailey, Stephens & Huettig
ATTORNEYS

INVENTOR
HENRI GEORGES DE FRANCE
BY
Bailey, Stephens & Huettig
ATTORNEYS

INVENTOR
HENRI GEORGES DE FRANCE
BY
Bailey, Stephens & Huettig
ATTORNEYS

March 3, 1959 H. G. DE FRANCE 2,876,278
COLOR TELEVISION SYSTEMS
Filed Jan. 28, 1952 7 Sheets-Sheet 5

INVENTOR
HENRI GEORGES DE FRANCE
BY
Bailey, Stephens & Huettig
ATTORNEYS

INVENTOR
HENRI GEORGES DE FRANCE
BY
Bailey, Stephens & Huettig
ATTORNEYS

March 3, 1959 H. G. DE FRANCE 2,876,278

COLOR TELEVISION SYSTEMS

Filed Jan. 28, 1952 7 Sheets-Sheet 7

INVENTOR
HENRI GEORGES DE FRANCE

BY
Bailey, Stephens & Huettig
ATTORNEYS

United States Patent Office 2,876,278
Patented Mar. 3, 1959

2,876,278

COLOR TELEVISION SYSTEMS

Henri Georges de France, Paris, France

Application January 28, 1952, Serial No. 268,629

Claims priority, application France September 14, 1948

11 Claims. (Cl. 178—5.2)

The present application, which is a continuation in part of my U. S. application Ser. No. 76,806 of February 16, 1949, relates to color television systems.

In said application, now United States Patent No. 2,700,700, I suggested, in order to reproduce a picture of a scene, to mix together sharp elementary images or image portions and blurred elementary images or image portions, while varying constantly, according to a predetermined law, the distribution of the sharp and blurred images or portions. This proposition was based on experiments mentioned in said application and according to which I established that, due to the retinal persistence phenomena, the simultaneous or successive projections of sharp and blurred elementary pictures or picture portions on the same screen gave a resulting picture sufficiently sharp, the sharpness of said pictures being approximately equal to the sharpness of the sharp elementary pictures or picture portions (maximum sharpness) if said sharp pictures or portions were projected during a sufficient time (relative to the projection of the blurred ones) on said screen. Such results were obtained with black and white and with colored pictures, as well on a cinema as on a television screen.

Therefore, it is the object of the invention to apply the result of such experiments to color television systems, especially in order to reduce the frequency band, the total transmission frequency band used serving to transmit sharp images or image portions over a wide frequency band and blurred images or image portions over narrower frequency bands, the total image having, for an observer, because of the retinal persistence phenomena, substantially the sharpness of the sharp images, whereas the total frequency band is narrower than the frequency band necessary for transmitting only sharp images.

In particular, according to the invention, color television transmissions take place through separate channels (generally three separate channels) at least one (and generally only one) of the channels transmitting a sharp picture in a primary color whereas the other channels transmit pictures of lower resolution, the attribution of each of these channels to the various primary colors being constantly interchanged, whereby, in the receiving apparatus, every elementary image of each color periodically presents the maximum sharpness, thereby obtaining substantially the same general sharpness of the color image as if several (generally three) sharp images in each primary color were continuously transmitted and received; but the frequency band, being equal to the sum of the frequency bands of the separate channels, is narrower than the product of the frequency band of the wide band channel transmitting the sharp images multiplied by the number of channels. In particular, when three channels are used and only one transmits a sharp picture, and supposing that the frequency bands of the channels transmitting the blurred pictures of lower resolution is less than one half of the frequency band of the first channel, a total frequency band of less than twice the width of the frequency band of the channel transmitting sharp images is necessary, thereby realizing a substantial reduction of the frequency band necessary for transmitting a color image of given general sharpness.

It is well known that in the "simultaneous" color television systems, such as some of the R. C. A. systems, three primary color signals of same frequency band are transmitted simultaneously, thereby necessitating a total frequency band of a width equal to three times the frequency band of each primary color signal. Generally, in order to reduce the total frequency band, the sharpness of the color image is reduced relative to the sharpness of the black and white image.

On the other hand, in the "sequential" color television systems, as the C. B. S. system, three primary color signals of same frequency band are transmitted serially on a single channel having a frequency band substantially equal to three times the frequency band of a primary color signal because the field frequency has to be increased, relative to the field frequency of black and white television, in order to prevent the flicker which would be produced by a low field frequency. As in the "simultaneous" system, the frequency band of the primary color signal is reduced over the frequency band of black and white transmission in order to obtain a total frequency band which has a practical size.

On the contrary, it is an object of the invention to provide a color television system giving in the receiving apparatus a color picture of a definition as good as that of black and white pictures and requiring a frequency band which is considerably less than three times the width of the frequency band required for the transmission of a black and white picture of the same sharpness.

Preferred embodiments of the present invention will be hereinafter described with reference to the accompanying drawings, given merely by way of example, and in which.

Figure 1:
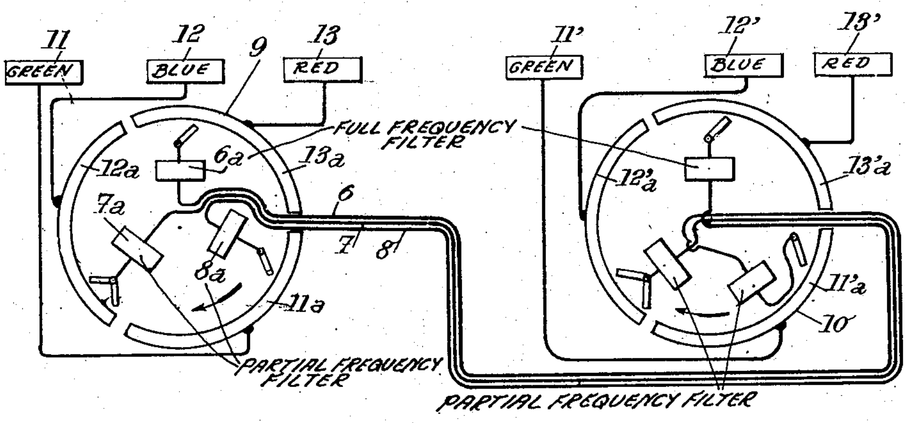
Fig. 1 is a diagrammatical view of a system according to my invention.
Figures 2, 2A:
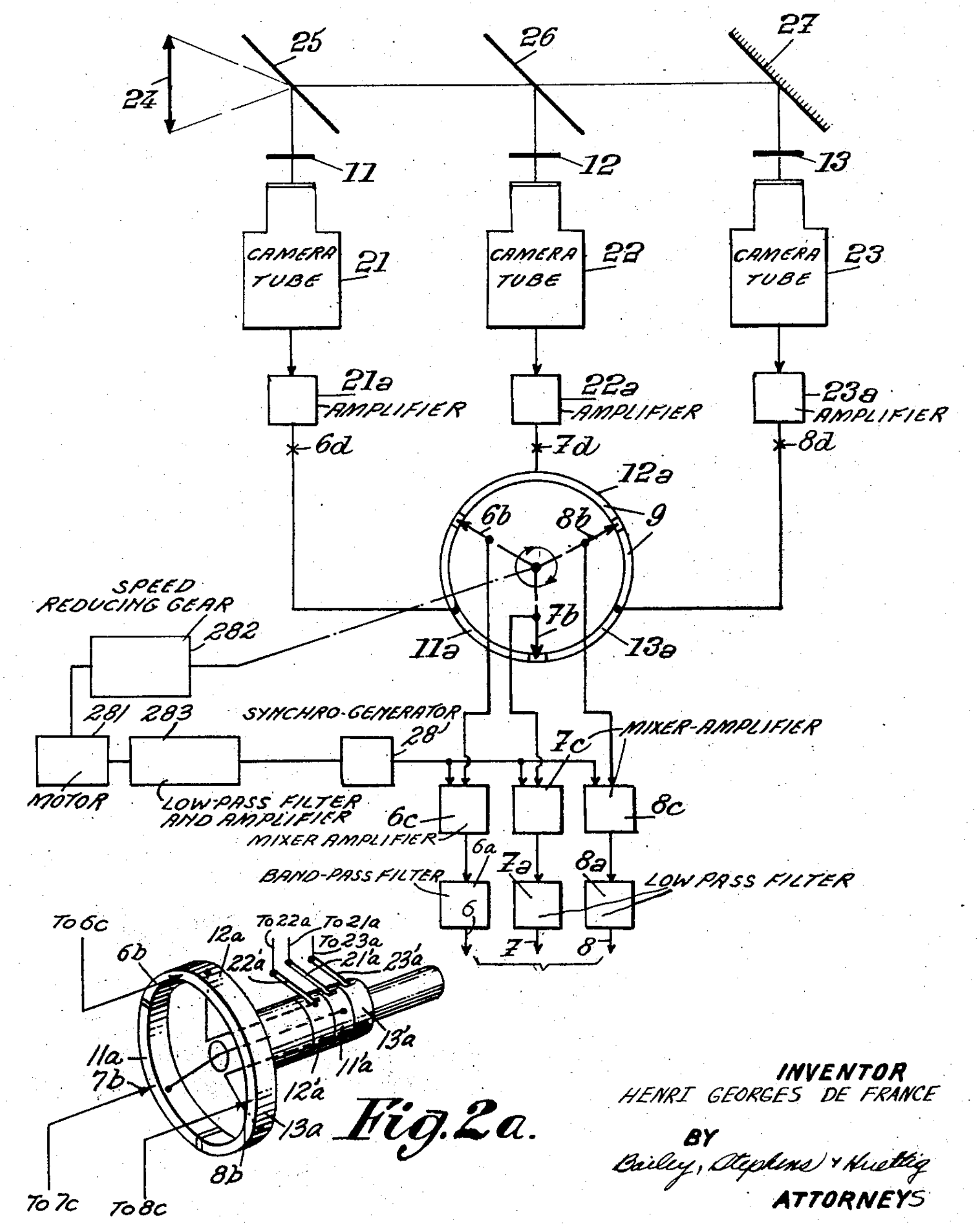
Figs. 2 and 3 are the lay-outs of a transmitter and a receiver, respectively, made on the principle illustrated by Fig. 1.
Figure 3:
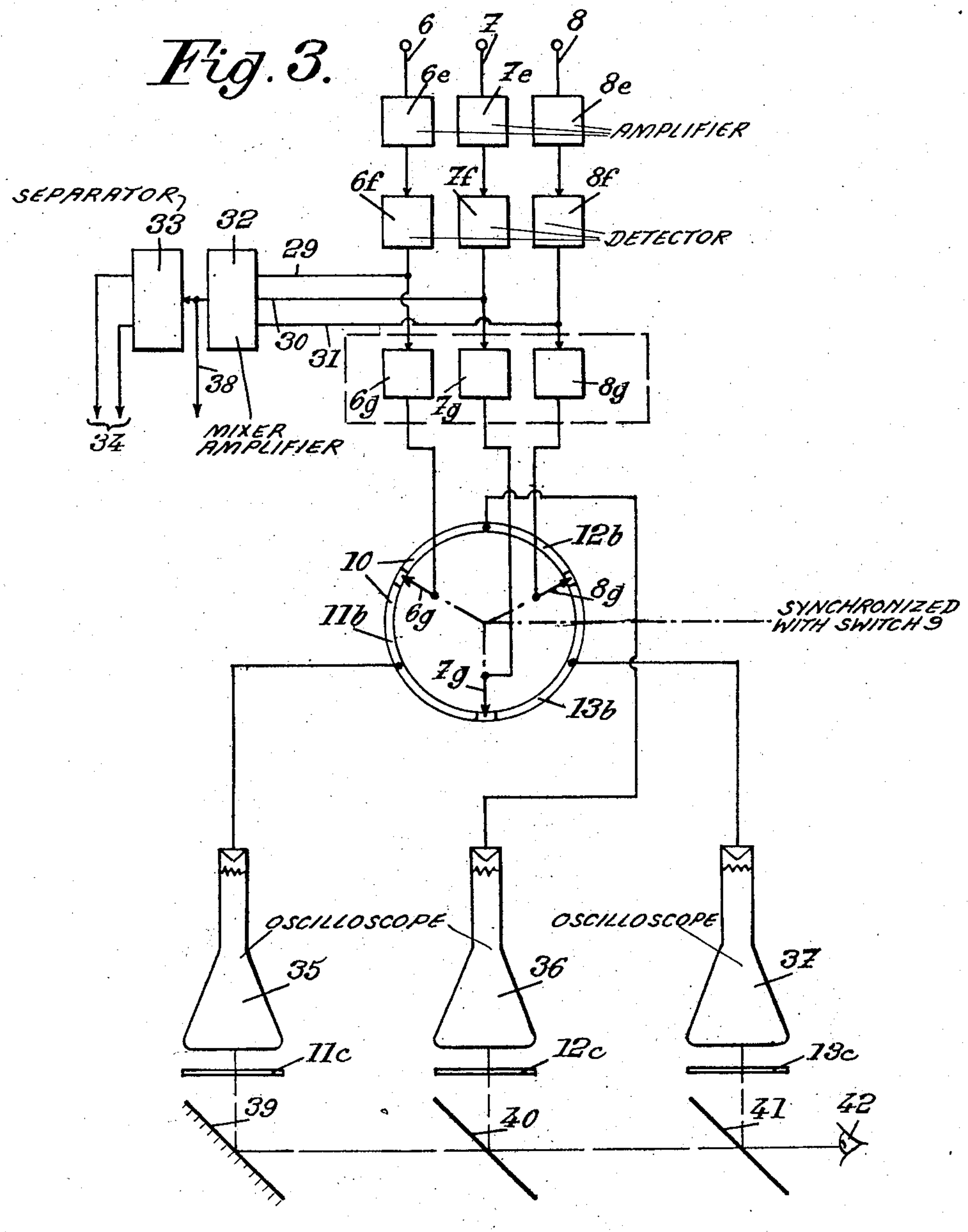
Figures 4, 5:
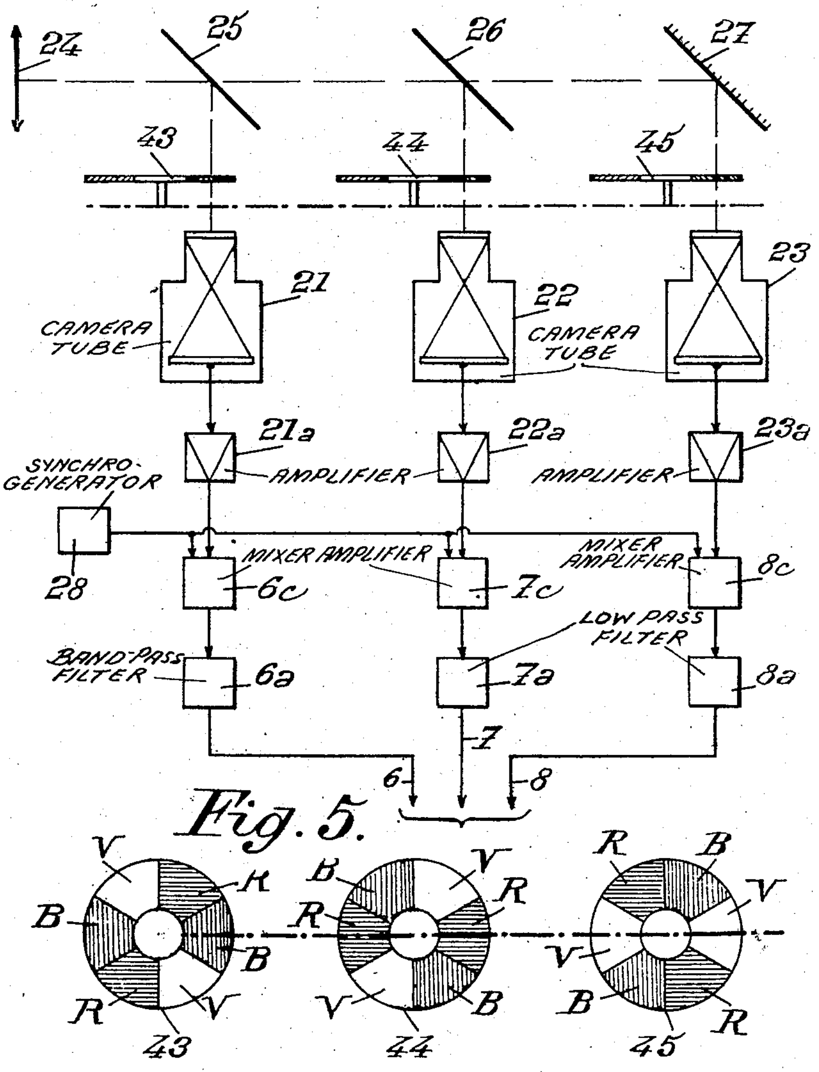
Figure 6:
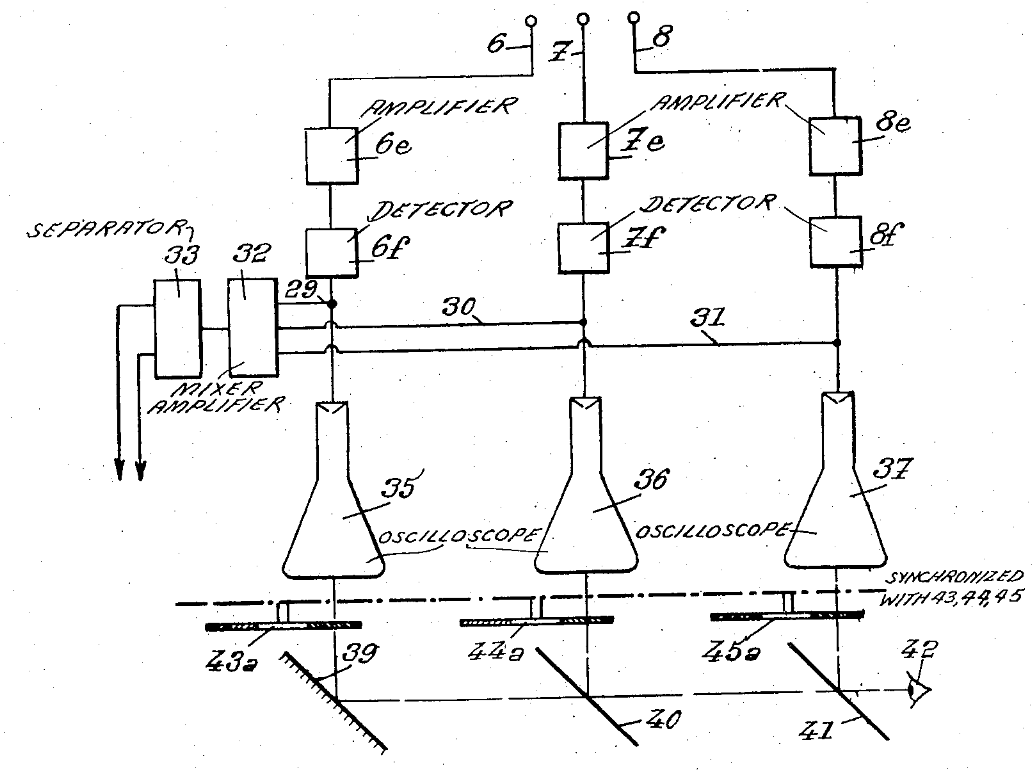
Figure 7:
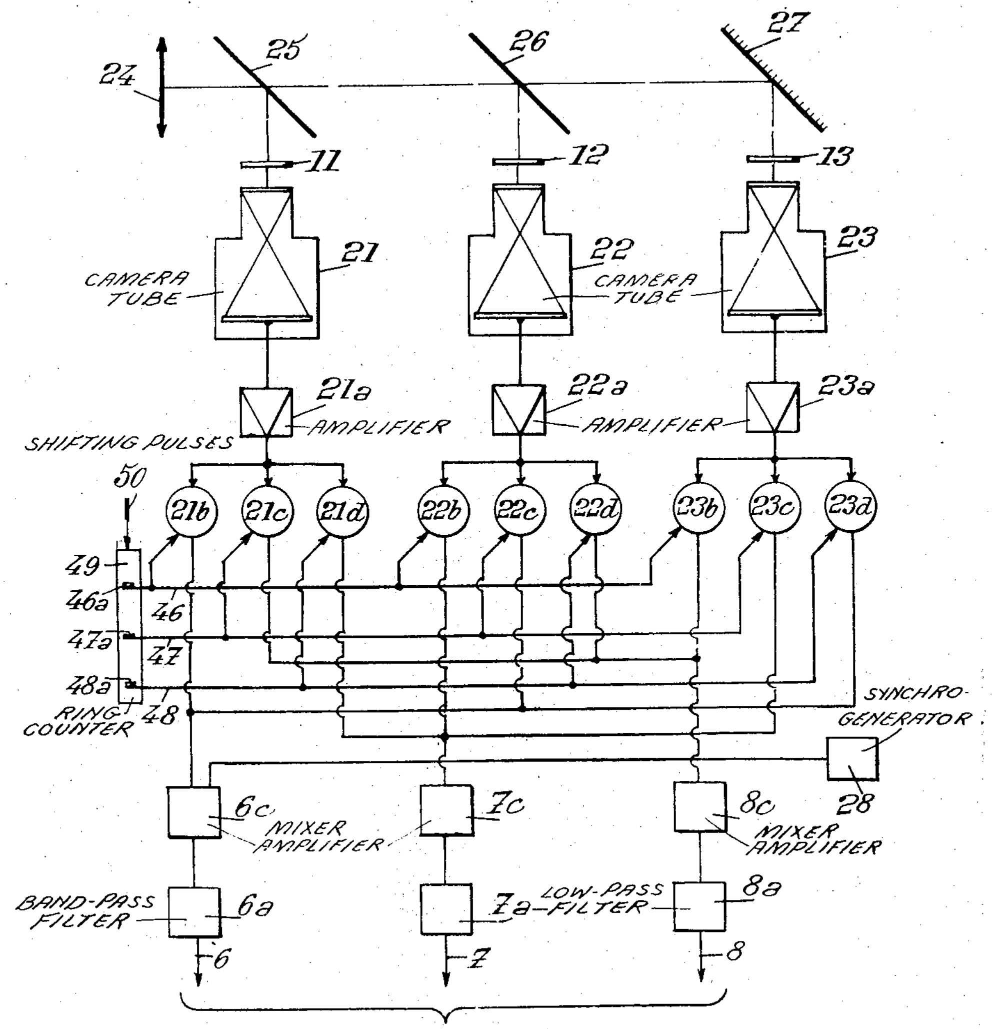
Figure 8:
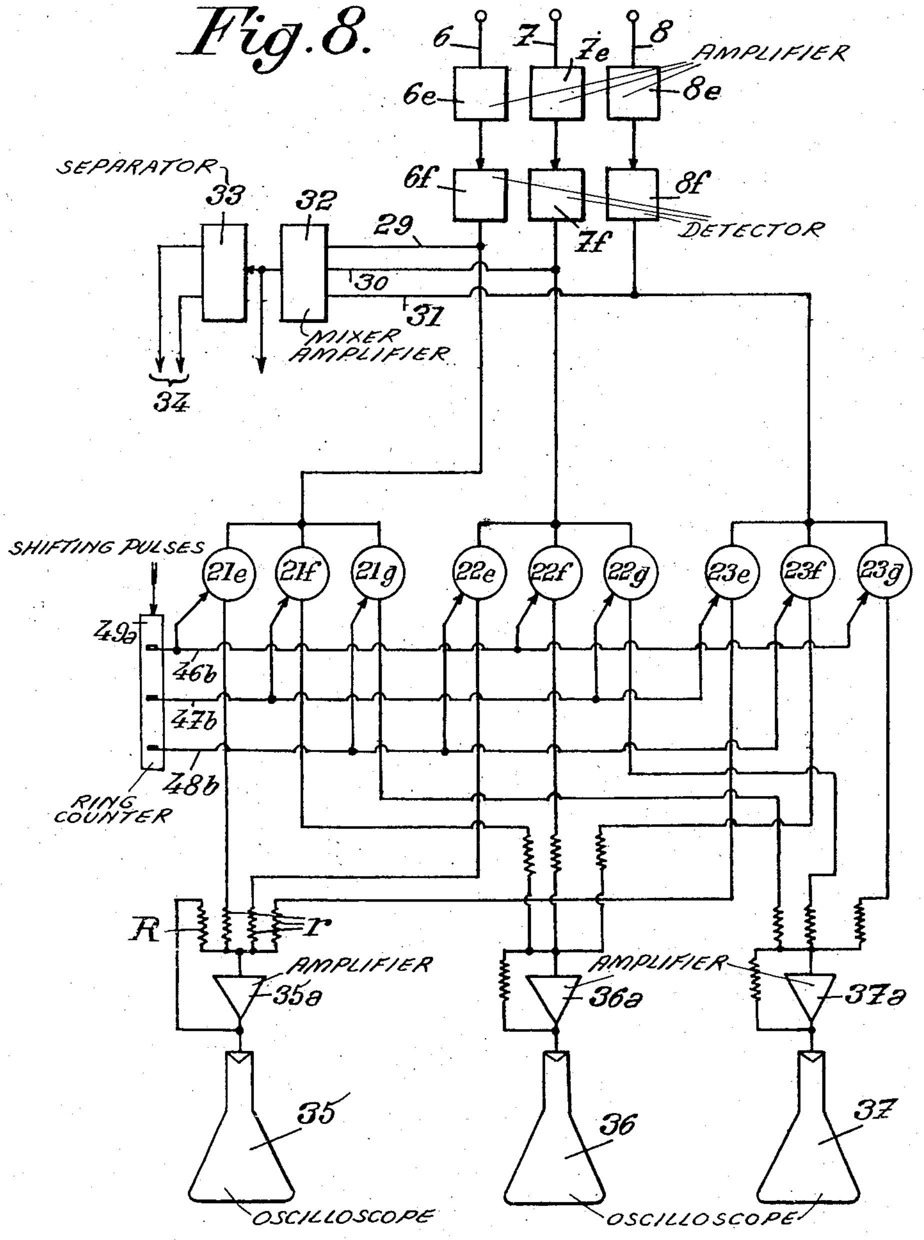

Fig. 2*a* is a detailed view of a switch which may be used in transmitter of Fig. 2;

Fig. 4 is a lay-out analogous to that of Fig. 1, in the case where shifting of the color signals from one transmission channel to another is obtained by means of rotating colored filters;

Fig. 5 is a view of these filters;

Fig. 6 shows the lay-out of a receiver intended to cooperate with the transmitter of Fig. 4;

Figs. 7 and 8 are views similar to Figs. 2 and 3, relating to the case where shifting of the color signals is obtained by means of electronic switches.

Fig. 1 diagrammatically shows a device for performing, at the transmitting and receiving stations, the necessary switchings. It has been supposed, in this example, that a three-colour transmission takes place through three independent channels 6, 7 and 8. Filters 6*a*, 7*a*, 8*a* are disposed at the transmitter at the end of these channels, one of the filters, 6*a* for instance, letting pass the whole of the spectrum resulting from the analysis, whereas the two other filters are low-pass filters, allowing only a portoin of the spectrum to pass. In other words, channel 6 transmits sharp images, whereas channels 7 and 8 transmit lower resolution images. Synchronized switches 9 and 10, one at the transmitting end and the other at the receiving end, shown in the form of mechanical switches, interchange the colors admitted at any time into each of the three channels. For this purpose, at the transmitting end, the green color signal 11 is connected in fixed manner with the sector 11*a* of the switch, the blue color signal 12 is connected with sector 12*a*, and the red color signal 13 is connected with sector 13a; the same arrangement exists at the receiving end, where the same elements are indicated by the same numerals with index '.

In the construction of Figs. 2 and 3, three images of the scene 24 to be transmitted by television are projected onto the sensitive elements of three camera tubes 21, 22, 23 respectively, by means of three mirrors 25, 26, 27, mirrors 25 and 26 being semi-transparent. Furthermore, a green filter 11, a blue filter 12 and a red filter 13 are interposed between mirrors 25, 26 and 27 and camera tubes 21, 22 and 23 respectively.

The outputs of these camera tubes are respectively connected with video pre-amplifiers 21a, 22a, 23a. The outputs of these amplifiers 21a, 22a, 23a are respectively connected with the three ring segments 11a, 12a, 13a of a mechanical rotating switch 9 running at a suitable rate, for instance at a number of revolutions per second equal to the field frequency. Connection between the pre-amplifiers 21a, 22a, 23a and these segments is achieved in any suitable manner, for instance by means of stationary brushes 21a, 22a, 23a connected with said amplifiers and cooperating with three slip rings 11'a, 12'a, 13'a electrically connected to the three segments 11a, 12a, 13a respectively, the slip rings and the segment forming a unit rotating as a whole (Fig. 2a), the passage of each brush from a slip ring to the next one taking place during the vertical blanking of the image analysis under the control of synchrogenerator 28.

Fixed brushes 6b, 7b, 8b disposed at 120° to one another cooperate with the ring formed by the three segments 11a, 12a, 13a. These last mentioned brushes are connected respectively to the three transmission channels 6, 7, 8 of the transmitter.

On these three channels are provided electric filters 6a, 7a, 8a respectively. One of these filters, for instance 6a, is a band-pass filter which passes the whole of the frequency band necessary to transmit sharp pictures, whereas at least one of the two others and preferably both of them pass only a portion of such a band, being for instance low-pass filters.

Furthermore, three amplifiers 6c, 7c, 8c are mounted in the respective channels for mixing the video signals and the synchronizing pulses transmitted from a synchrogenerator 28. These last mentioned amplifiers may be inserted either after brushes 6b, 7b, 8b, as shown by Fig. 2, or before them, for instance at the places 6d, 7d, 8d marked by crosses on this Fig. 2. If so desired, the mixing amplifiers 7c and 8c might receive only the blanking pulses and not the synchronizing pulses proper.

With such an arrangement, during a revolution of ring 11a—12a—13a, channel 6, through which a full frequency band can pass, receives successively three series of signals corresponding respectively to the green, red and blue chromatic components of the picture transmitted. During the same time, channel 7, through which only a partial frequency band can pass receives successively the red, blue and green components, while channel 8, which preferably also passes but a partial band successively receives the blue, red and green components. Thus, the color component transmissions cyclically succeed one another in each of the three channels.

These three channels may be constituted by three distinct (for instance coaxial) cables, or by a high frequency three channel modulation and radiation equipment of a conventional type.

At the receiver (Fig. 3), these three channels lead to three video and synchronizing signal amplifiers 6e, 7e, 8e having their outputs connected with three detectors 6f, 7f, 8f respectively.

These detectors have their outputs connected with a rotary switch 10, analogous to the rotary switch 9 of the transmitter, through brushes 6g, 7g, 8g respectively cooperating with the three ring segments 11b, 12b, 13b of this switch. Switch 10 forming a revolving unit (similar to the unit of Fig. 2a) with three slip rings (to which are electrically connected said segments and with which cooperate stationary brushes connected with the inputs of tubes 35, 36, 37) runs in synchronism and in phase with switch 9, the means (not shown) maintaining such synchronism being of any type known in the art e. g. of the type used for maintaining the synchronism between colored discs in the transmitter and in the receivers and described in United States Patents Nos. 2,329,194 and 2,323,905. However, between detectors 6f, 7f, 8f and switch 10, shunt connections 29, 30 and 31 lead to a mixer amplifier 32 having its output connected with a separator circuit 33 which passes only the line and frame synchronizing pulses sent through 34 to the scanning circuits of each of the three oscilloscopes 35, 36 and 37.

If it is desired to receive the televised picture in black and white, it suffices to collect the video signals at 38, at the output of mixer amplifier 32.

For color television reception, the three oscilloscopes 35, 36 and 37 are connected respectively to the three segments 11b, 12b and 13b of rotary switch 10. Thus each of the oscilloscopes successively receive the components of the same color of three successive pictures, transmitted respectively through channels 6, 7 and 8. In front of these oscilloscopes are placed optical color filters 11c, 12c, 13c, respectively green, blue and red and mirrors at 45° 39, 40, 41, the two last mentioned ones being semi-transparent, whereby a spectator placed at 42 sees a colored picture.

Between detectors 6f, 7f and 8f and switch 10, there may be provided electric filters 6g, 7g and 8g, for instance one passing a full band and the other two only band portions. But these filters can be dispensed with if the amplifier and detector stages have been chosen to pass frequency bands of these widths respectively.

Thus by transmitting one full frequency band through channel 6 and two partial frequency bands through channels 7 and 8, each primary color being sequentially transmitted through channels 6, 7 and 8, a color image of full frequency sharpness is obtained but using a total frequency band less than three times the width of the full frequency band, whereas if only the full frequency channel 6 were used for transmitting sequentially the primary colors, a color image of full frequency band could be obtained only with a total frequency band equal to three times the width of said full frequency band.

The system illustrated by Figs. 4, 5 and 6 is analogous in most aspects to that of Figs. 2 and 3. But shifting of the color components successively transmitted through each channel is obtained in this case through optical means. Therefore mechanical switches such as shown at 9 and 10 on Figs. 1, 2 and 3 are now unnecessary, but rotary optical color filters are interposed, at the transmitter at 43, 44 and 45 between the respective mirrors 25, 26 and 27 and camera tubes 21, 22 and 23, and at the receiver at 43a, 44a and 45a between the respective oscilloscopes 35, 36 and 37 and mirrors 39, 40 and 41. Each of these rotary filters includes two sets of three sectors R, B and V respectively red, blue and green, these sets being identical for the three filters. When a blue sector B of filter 43 is passing between mirror 25 and camera tube 21, a red sector R of filter 44 is passing between mirror 26 and camera tube 22, and a green sector V of filter 45 is passing between mirror 27 and camera tube 23 (Fig. 5). The three rotary filters 43, 44 and 45 are driven at the same speed. The filters 43a, 44a and 45a of the receiver are rotated in synchronism and in phase with the filters 43, 44 and 45 of the transmitter respectively. In Figs. 4 and 6, the same reference characters as already used for describing the system of Figs. 2 and 3 designate the same elements as in said Figs. 2 and 3.

It is pointed out that a single rotary filter might be used by placing the respective axes of the three camera tubes (or oscilloscopes) along three lines parallel to the axis of rotation of said filter and located respectively in three planes passing through this axis of rotation and making angles of 120° with one another.

Figs. 7 and 8 show a system of the same kind as that of Figs. 2 and 3 but in which shifting of the color component sets of signals is obtained by means of an electronic switch.

Fig. 7 shows most of the elements shown by Fig. 2, these elements being designated by the same reference numerals as in Fig. 2.

In the system illustrated by Fig. 7, each of the outputs of the video pre-amplifiers *21a, 22a, 23a* is connected in parallel with a gate or set of three tubes, to wit **21*b*—21*c*—21*d* for pre-amplifier 21*a*, 22*b*—22*c*—22*d* for pre-amplifier 22*a*, and 23*b*—23*c*—23*d* for pre-amplifier 23*a***. Each of these tubes includes a suppressor grid normally biased so as to prevent current to flow through the tube.

The outputs of tubes **21*b*, 22*c* and 23*d* are connected with channel 6 through amplifier 6*c*. The outputs of tubes 21*d*, 22*b* and 23*c* are connected with channel 7 through amplifier 7*c*. The outputs of tubes 21*c*, 22*d* and 23*b* are connected with channel 8 through amplifier 8*c***.

The suppressor grids of tubes **21*b*, 22*b* and 23*b* are connected with a common conductor 46. The suppressor grids of tubes 21*c*, 22*c* and 23*c* are connected with a common conductor 47. The suppressor grids of tubes 21*d*, 22*d* and 23*d* are connected with a common conductor 48. These three conductors 46, 47 and 48 are respectively connected with the three plates 46*a*, 47*a* and 48*a* of a three-stage ring counter 49 which receives impulses from 50 and supplies, at its three plates 46*a*, 47*a* and 48*a*, successively and recurrently, voltage impulses delivered through conductors 46, 47 and 48** to the suppressor grids of the tubes to make these tubes conductive.

Thus, upon a voltage impulse transmitted from 50 through conductor 46, tubes **21*b*, 22*b* and 23*b* are made conductive and connect the outputs of pre-amplifiers 21*a*, 22*a* and 23*a* with channels 6, 7 and 8, respectively. Upon a second impulse transmitted from 50 through conductor 47, tubes 21*c*, 22*c* and 23*c* are made conductive and connect pre-amplifiers 21*a*, 22*a* and 23*a* with channels 8, 6 and 7, respectively. Upon a third impulse transmitted from 50 through conductor 48, tubes 21*d*, 22*d* and 23*d* are made conductive and connect pre-amplifiers 21*a*, 22*a* and 23*a*** with channels 7, 8 and 6, respectively. Then the cycle is repeated and so on.

The input 50 of the three-stage ring counter 49 is connected with a generator of shifting impulses. If shifting takes place at the frequency of frame pulses, this generator is the frame synchronizing pulse generator itself. But any other suitable frequency of shifting may be adopted.

The tubes of the gates **21*b*—21*c*—21*d*, 22*b*—22*c*—22*d* and 23*b*—23*c*—23*d*** must be of sufficiently high internal impedance, which is the case of commercial pentode tubes.

This switching system gives the same cycle of operation as the mechanical switch of Fig. 2.

At the receiver end, the electronic switching arrangement (Fig. 8) is the same as that above described with reference to the transmitter, the connections being reversed so as to redistribute the color component sets of signals to oscilloscopes 35, 36 and 37. The gates **21*e*—21*f*—21*g*, 22*e*—22*f*—22*g* and 23*e*—23*f*—23*g* are controlled through conductors 46*b*, 47*b* and 48*b* by a ring counter 49*a* receiving the same impulses as the ring counter 49 of the transmitter. The outputs of the gates are connected with oscilloscopes 35, 36 and 37 through amplifiers 35*a*, 36*a* and 37*a***, respectively, these amplifiers preferably having a high gain, with input resistances *r* and negative feed back resistances R (in this example, R is equal to *r*).

Otherwise, the arrangement is the same as in the case of Fig. 3.

In a general manner, while I have, in the above description, disclosed what I deem to be practical and efficient embodiments of my invention, it should be well understood that I do not wish to be limited thereto as there might be changes made in the arrangement, disposition and form of the parts without departing from the pinciple of the present invention as comprehended within the scope of the accompanying claims.

What I claim is:

1. A color television system which comprises, in combination, means forming three distinct electric video signal transmission channels one of which is of normal video frequency band width and the other two of narrower band width, means at the transmitting end of said channels for forming three distinct series of video signals each representative of a different primary color component image of the picture to be reproduced, means for transmitting said distinct series of signals through said respective channels simultaneously, switch mean for periodically shifting each of said series of video signals from one channel to another, simultaneously for the three series and in recurrent permuting fashion so that every series of signals is chopped into a multiplicity of groups which are successively and distributively passed through said three channels, and a receiver device at the other end of said three channels including a set of three video signal receiver means for receiving said three successions of groups of signals respectively, a set of three means connected with said receiver means for converting said received groups of signals into groups of light images, a set of three color filter means for giving primary colors to said groups of images respectively, switch means working in synchronism with said first mentioned switch means for distributively interconnecting the means of the three last mentioned sets to form at any time three different primary color images, one from said normal width wave band channel and the other two from said reduced width wave band channels respectively, and periodically to shift the color to wave band width relation for the three respective images simultaneously, and optical means for superimposing said three primary color images.

2. A color television transmitter which comprises, in combination, means forming three distinct electric video signal transmission channels one of which is of normal video frequency band width and the other two of smaller band width, means for forming three distinct series of video signals each representative of a different primary color component image of the picture to be reproduced, means for transmitting said distinct series of signals to said channels respectively, and switch means for periodically shifting each of said series of video signals from one channel to another, simultaneously for the three series and in recurrent permutation fashion, whereby every series of signals is chopped into a multiplicity of groups which are successively and distributively passed through said three channels respectively.

3. A color television transmitter which comprises, in combination, means forming three distinct electric video signal transmission channels one of which is of normal video frequency band width and the other two of narrower band width, three camera tubes, optical means for projecting onto the respective photo sensitive elements of said three tubes three images of the picture to be reproduced, said optical means including three fixed colored filters of three different primary colors placed in front of said sensitive elements respectively, and switch means for connecting the outputs of said three tubes with said three channels respectively while periodically shifting the connections between the outputs of said three tubes and said three channels simultaneously for the three tubes and in recurrent permutation fashion so that the series of signals from each of said tubes is chopped into a multiplicity of groups which are successively and distributively transmitted through said three channels.

4. A color television transmitter according to claim 3 in which said switch means are constituted by a mechanical switch.

5. A color television transmitter according to claim 3 in which said switch means are constituted by an electronic switch.

6. A color television transmitter which comprises, in combination, means forming three distinct electric video signal transmission channels one of which is of normal video frequency band width and the other two of narrower band width, three camera tubes, optical means for projecting onto the respective photo-sensitive elements of said three tubes three images of the picture to be reproduced, rotating switch means including each at least three colored filters of three primary colors for simultaneously interposing a filter of one primary color across the path of the light rays directed by said optical means toward one tube, a filter of another primary color across the path of the light rays travelling toward another tube, and a filter of the third primary color across the path of the light rays travelling toward the third tube, and fixed means for connecting the outputs of said three tubes with said three channels respectively so that the series of signals from each of said tubes is chopped into a multiplicity of groups which are successively and distributively transmitted through said three channels.

7. A color television receiver for use with three wave transmissions passed through three transmission channels, one of normal video frequency band width and the other two of narrower band width, each of said wave transmissions being constituted by a succession of groups of video signals, any three successive group of each of said wave transmission belonging respectively to three series of video signals each representative of a different primary color component image of the picture to be reproduced, and the three groups, belonging to said three series respectively, that are simultaneously transmitted through said three channels respectively undergoing simultaneous channel shifting according to a recurrent permutation, this receiver comprising, in combination, a set of three video signal receiver means for receiving said three wave transmission respectively, a set of three means connected with said receiver means for converting said groups of signals into groups of light images, a set of three color filter means for giving said primary colors to said groups of images respectively, switch means working in synchronism with said channel shifting for distributively interconnecting the means of three last mentioned sets to form at any time three different primary color images, one from said normal width wave band channel and the other two from said narrow width wave band channels respectively and periodically to shift the color to wave band width relation for the three respective images simultaneously, and optical means for superimposing said three primary color images.

8. A color television receiver for use with three wave transmissions passed through three transmission channels, one of normal video frequency band width and the other two of narrower band width, each of said wave transmissions being constituted by a succession of groups of video signals, any three successive groups of each of said wave transmissions belonging respectively to three series of video signals each representative of a different primary color component image of the picture to be reproduced, and the three groups, belonging to said three series respectively, that are simultaneously transmitted through said three channels respectively undergoing simultaneous channel shifting according to a recurrent permutation, this receiver comprising, in combination, three video signal receiver means for receiving said three wave transmissions respectively, three oscilloscopes, three colored filters of said primary colors, optical means for combining the images of said screens seen through said colored filters, switch means for distributively connecting the inputs of said oscilloscopes with said three receiver means, and means for synchronizing said switch means with said channel shifting to obtain always on each of said oscilloscope screens a primary color image of the same color.

9. A color television receiver according to claim 8, in which said switch means are constituted by a mechanical switch.

10. A color television receiver according to claim 8, in which said switch means are constituted by an electronic switch.

11. A color television receiver for use with three wave transmissions passed through three transmission channels, one of normal video frequency band width and the other two of narrower band width, each of said wave transmissions being constituted by a succession of groups of video signals, any three successive groups of each of said wave transmissions belonging respectively to three series of video signals each representative of a different primary color component image of the picture to be reproduced, and the three groups, belonging to said three series respectively, that are simultaneously transmitted through said three channels respectively undergoing simultaneous channel shifting according to a recurrent permutation, this receiver comprising, in combination, a three video signal receiver means for receiving said three wave transmissions respectively, three oscilloscopes having their inputs connected permanently with said receiver means respectively, optical means for superimposing the respective images obtained on the screen of said oscilloscopes, three rotating switches including each at least three colored filters of said primary colors for simultaneously interposing a filter of one primary color across the path of the light rays travelling from one of said screens to said optical means, a filter of another primary color across the path of the light rays travelling from another of said screens to said optical means and a filter of the third primary color across the path of the light rays travelling from the third of said screens to said optical means, and means for synchronizing said switch means with said channel shifting to have constantly opposite each of said screens the color filter which corresponds to the image formed on said screen.

References Cited in the file of this patent

UNITED STATES PATENTS

| | | |
|---|---|---|
| 2,335,180 | Goldsmith | Nov. 23, 1943 |
| 2,554,693 | Bedford | May 29, 1951 |
| 2,559,843 | Bedford | July 10, 1951 |
| 2,580,903 | Evans | Jan. 1, 1952 |

OTHER REFERENCES

Radio and Television News, December 1949, pages 35–37, 101, 102, 104 and 106.